(12) United States Patent
Clark (10) Patent No.: US 7,665,713 B1
(45) Date of Patent: Feb. 23, 2010

(54) SLEEVE VALVE FOR RESIDENTIAL AND COMMERCIAL IRRIGATION SYSTEMS

(75) Inventor: Michael L. Clark, San Marcos, CA (US)

(73) Assignee: Hunter Industries, Inc., San Marcos, CA (US)

(*) Notice: Subject to any disclaimer, the term of this patent is extended or adjusted under 35 U.S.C. 154(b) by 602 days.

(21) Appl. No.: 11/458,047

(22) Filed: Jul. 17, 2006

Related U.S. Application Data (63) Continuation-in-part of application No. 11/472,964, filed on Jun. 21, 2006, now Pat. No. 7,503,346.

(51) Int. Cl.
*F16K 7/04* (2006.01)

(52) U.S. Cl. .............................. 251/5; 251/4
(58) Field of Classification Search ............... 251/4, 251/5; 285/13, 14
See application file for complete search history.

(56) References Cited

U.S. PATENT DOCUMENTS

| | | | | | |
|---|---|---|---|---|---|
| 994,167 | A | * | 6/1911 | Koppitz | 137/492 |
| 994,168 | A | * | 6/1911 | Koppitz | 137/492 |
| 2,310,628 | A | * | 2/1943 | Grove | 137/601.03 |
| 2,317,376 | A | * | 4/1943 | Grove et al. | 251/5 |
| 2,328,902 | A | * | 9/1943 | Grove | 114/198 |
| 2,331,291 | A | * | 10/1943 | Annin | 251/5 |
| 2,353,143 | A | * | 7/1944 | Bryant | 137/492 |
| 2,360,873 | A | * | 10/1944 | Grove | 251/5 |
| 2,573,864 | A | * | 11/1951 | Moran | 417/290 |
| 2,608,204 | A | * | 8/1952 | Dunn | 137/220 |
| 2,621,889 | A | * | 12/1952 | Annin | 137/853 |
| 2,622,619 | A | * | 12/1952 | Grove | 251/50 |
| 2,622,620 | A | * | 12/1952 | Annin | 251/5 |
| 2,650,607 | A | * | 9/1953 | Bryant | 137/468 |
| 2,818,880 | A | * | 1/1958 | Ratelband | 137/516.11 |
| 2,988,103 | A | * | 6/1961 | Canvasser | 137/218 |
| 3,092,144 | A | * | 6/1963 | Green | 137/625.3 |
| 3,118,646 | A | * | 1/1964 | Markey | 251/5 |
| 3,145,967 | A | | 8/1964 | Gardner | 251/5 |
| 3,159,373 | A | * | 12/1964 | Kroffke | 251/5 |
| 3,272,470 | A | * | 9/1966 | Bryant | 251/5 |
| 3,306,569 | A | * | 2/1967 | Bryant | 251/5 |
| 3,325,138 | A | * | 6/1967 | Connolly | 251/5 |
| 3,371,677 | A | * | 3/1968 | Connolly | 137/315.07 |
| 3,467,131 | A | * | 9/1969 | Ratelband | 137/269 |
| 3,522,926 | A | * | 8/1970 | Bryant et al. | 251/5 |
| 3,624,801 | A | * | 11/1971 | Gannon | 251/5 |
| 3,669,142 | A | * | 6/1972 | Gerbic | 137/489 |

(Continued)

OTHER PUBLICATIONS

Marketing Brochure for 800 Series Control Valves by Nelson, Nov. 1995 CP 5M (4 pages).

*Primary Examiner*—John K Fristoe, Jr.
*Assistant Examiner*—Marina Tietjen
(74) *Attorney, Agent, or Firm*—Michael H. Jester (57) ABSTRACT

A sleeve valve includes a rigid mandrel with a plurality of openings and a generally cylindrical elastomeric sleeve that surrounds the mandrel. A generally cylindrical rigid sleeve valve housing surrounds the elastomeric sleeve and defines a control chamber between the elastomeric sleeve and the sleeve valve housing. A pilot valve is mounted to the sleeve valve housing for supplying pressurized liquid to, and venting pressurized liquid from, the control chamber through a first passage formed in the sleeve valve housing. A filter screens debris from pressurized liquid entering an inlet end of the sleeve valve housing before it enters a second passage that communicates with the pilot valve.

18 Claims, 12 Drawing Sheets

U.S. PATENT DOCUMENTS

| | | | | |
|---|---|---|---|---|
| 3,672,632 A * | 6/1972 | Chow | | 251/151 |
| 3,690,344 A * | 9/1972 | Brumm | | 137/625.28 |
| 3,836,113 A * | 9/1974 | Johnson | | 251/5 |
| 3,838,704 A * | 10/1974 | Johnson | | 137/15.18 |
| 3,942,756 A * | 3/1976 | Brumm et al. | | 251/5 |
| 4,023,772 A * | 5/1977 | Ratelband | | 251/5 |
| 4,026,513 A * | 5/1977 | Callenberg | | 251/61.1 |
| 4,050,669 A * | 9/1977 | Brumm | | 251/5 |
| 4,083,375 A * | 4/1978 | Johnson | | 137/86 |
| 4,138,087 A * | 2/1979 | Kruse et al. | | 251/5 |
| 4,313,461 A * | 2/1982 | Brumm | | 137/489 |
| 4,364,410 A * | 12/1982 | Chow | | 137/489 |
| 4,395,016 A * | 7/1983 | Welker | | 251/5 |
| 4,412,554 A * | 11/1983 | Chow | | 137/375 |
| 4,451,023 A * | 5/1984 | Zakai | | 251/5 |
| 4,582,081 A * | 4/1986 | Fillman | | 137/218 |
| 4,645,174 A * | 2/1987 | Hicks | | 251/5 |
| 4,925,153 A * | 5/1990 | Romer | | 251/30.01 |
| 5,000,214 A * | 3/1991 | Pelkey | | 137/14 |
| 5,035,259 A * | 7/1991 | Allen et al. | | 137/488 |
| 5,036,879 A * | 8/1991 | Ponci | | 137/496 |
| 5,145,145 A * | 9/1992 | Pick et al. | | 251/30.03 |
| 5,158,230 A * | 10/1992 | Curran | | 236/49.4 |
| 5,520,367 A * | 5/1996 | Stowers | | 251/96 |
| 5,671,774 A | 9/1997 | Klein et al. | | 137/486 |
| 5,996,608 A | 12/1999 | Hunter et al. | | 137/244 |
| 6,079,437 A | 6/2000 | Beutler et al. | | 137/181 |
| 6,189,857 B1 * | 2/2001 | Zeger et al. | | 251/61.1 |
| 6,457,697 B1 * | 10/2002 | Kolze | | 251/30.03 |
| 2005/0173006 A1 * | 8/2005 | Marcichow et al. | | 137/549 |
| 2008/0142747 A1 * | 6/2008 | Jennings et al. | | 251/5 |

* cited by examiner

SLEEVE VALVE FOR RESIDENTIAL AND COMMERCIAL IRRIGATION SYSTEMS

CROSS-REFERENCE TO RELATED APPLICATION

This application is a continuation-in-part of pending U.S. patent application Ser. No. 11/472,964, filed Jun. 21, 2006, of Michael L. Clark entitled "Solenoid Actuated Pilot Valve for Irrigation System Valve."

FIELD OF THE INVENTION

The present invention relates to valves used to control the flow of liquids, and more particularly, to solenoid operated valves typically used to turn ON and OFF the flow of water in residential and commercial irrigation systems.

BACKGROUND OF THE INVENTION

In a typical irrigation system a manually programmable electronic controller selectively energizes a solenoid operated valve to cause pressurized water to be delivered to a set of sprinklers connected to a common buried PVC pipe. Each set of sprinklers is referred to as a station or zone and is supplied with pressurized water by a corresponding solenoid actuated valve. The solenoid operated valve typically has a clam shell or bonnet configuration exemplified in U.S. Pat. No. 6,079,437 granted Jun. 27, 2000 to Matthew G. Beutler et al. and assigned to Hunter Industries, Inc. In a bonnet valve, pressurized upstream or inlet water passes via a small metering orifice in a central metering body to a control chamber inside the upper clam shell on the back side of a circular elastomeric diaphragm to apply a closing pressure. This forces the periphery of a valve member connected to the diaphragm against a valve seat. Water can be vented from the control chamber through a small pilot valve passage which is opened by a solenoid actuated pilot valve, which causes the diaphragm and valve member to move upwardly and allow water to flow freely through the valve. The solenoid operated pilot valve typically has small orifices that need protection from debris to prevent clogging. A screen has been successfully used to protect the pilot valve in a bonnet valve, as disclosed in U.S. Pat. No. 5,996,608 granted Dec. 7, 1999 to Richard E. Hunter and assigned to Hunter Industries, Inc. Another type of valve used in industrial and agricultural applications, but not in residential and commercial irrigation systems, is known as a sleeve valve and is exemplified in U.S. Pat. No. 5,671,774 granted Sep. 30, 1997 to Klein et al. and assigned to Nelson Irrigation Corporation. In a sleeve valve, a substantially cylindrical elastomeric sleeve is surrounded by an outer cylindrical rigid housing to define a control chamber between the sleeve and housing. The ends of the elastomeric sleeve overlap a mandrel including opposing frusto-conical sections having circumferentially spaced openings. A solenoid operated pilot valve can release water pressure inside the control chamber to allow the elastomeric sleeve to expand and uncover the openings, thereby allowing water to flow freely through the sleeve valve. Sleeve valves heretofore commercialized have been relatively large, complex structures utilizing O-rings, bolts and/or screws and including manual ON/OFF controls.

SUMMARY OF THE INVENTION

In accordance with an embodiment of the invention, a sleeve valve includes a rigid mandrel with a plurality of openings and a generally cylindrical elastomeric sleeve that surrounds the mandrel. A generally cylindrical rigid sleeve valve housing surrounds the elastomeric sleeve and defines a control chamber between the sleeve valve housing and the elastomeric sleeve. A pilot valve supplies pressurized liquid to, and venting pressurized liquid from, the control chamber through a first passage formed in the sleeve valve housing. A filter screens debris from pressurized liquid entering an inlet end of the sleeve valve housing before it enters a second passage that communicates with the pilot valve.

DETAILED DESCRIPTION

The entire disclosure of the aforementioned pending U.S. patent application Ser. No. 11/472,964, filed Jun. 21, 2006, of Michael L. Clark entitled "Solenoid Actuated Pilot Valve for Irrigation System Valve" is hereby incorporated by reference.

Figure 1:
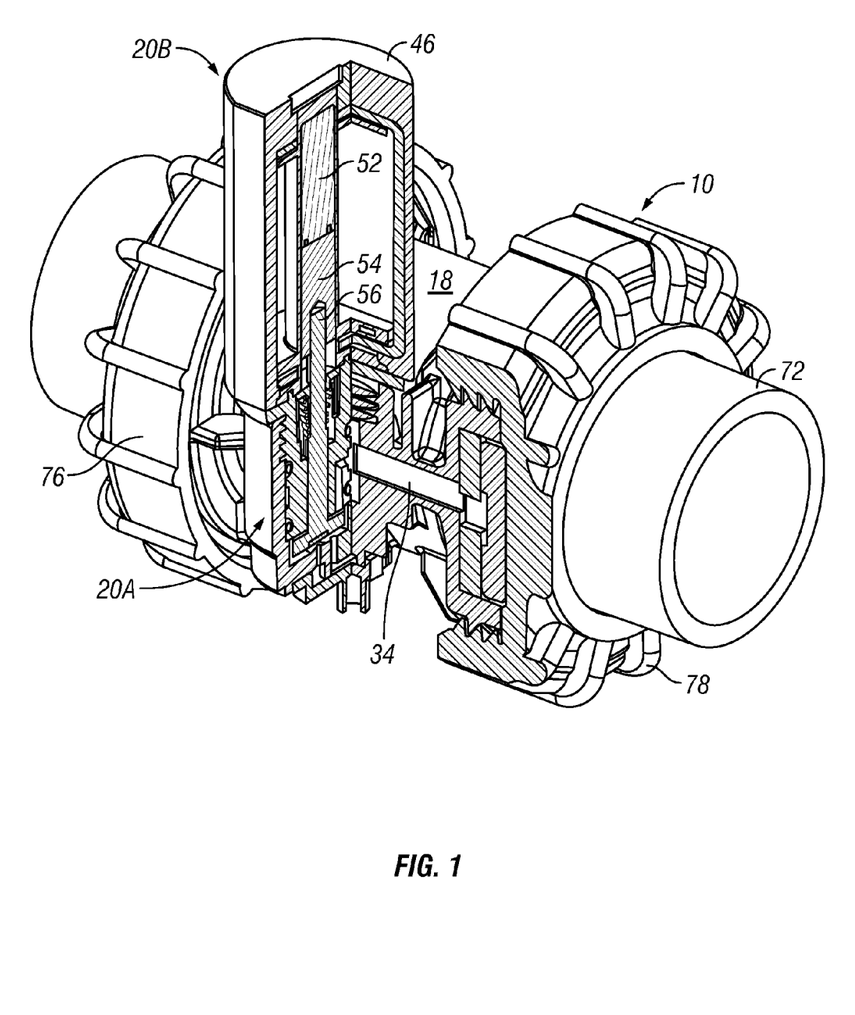
FIG. 1 is a fragmentary isometric view of a sleeve valve in accordance with an embodiment of the present invention.
Figure 2:
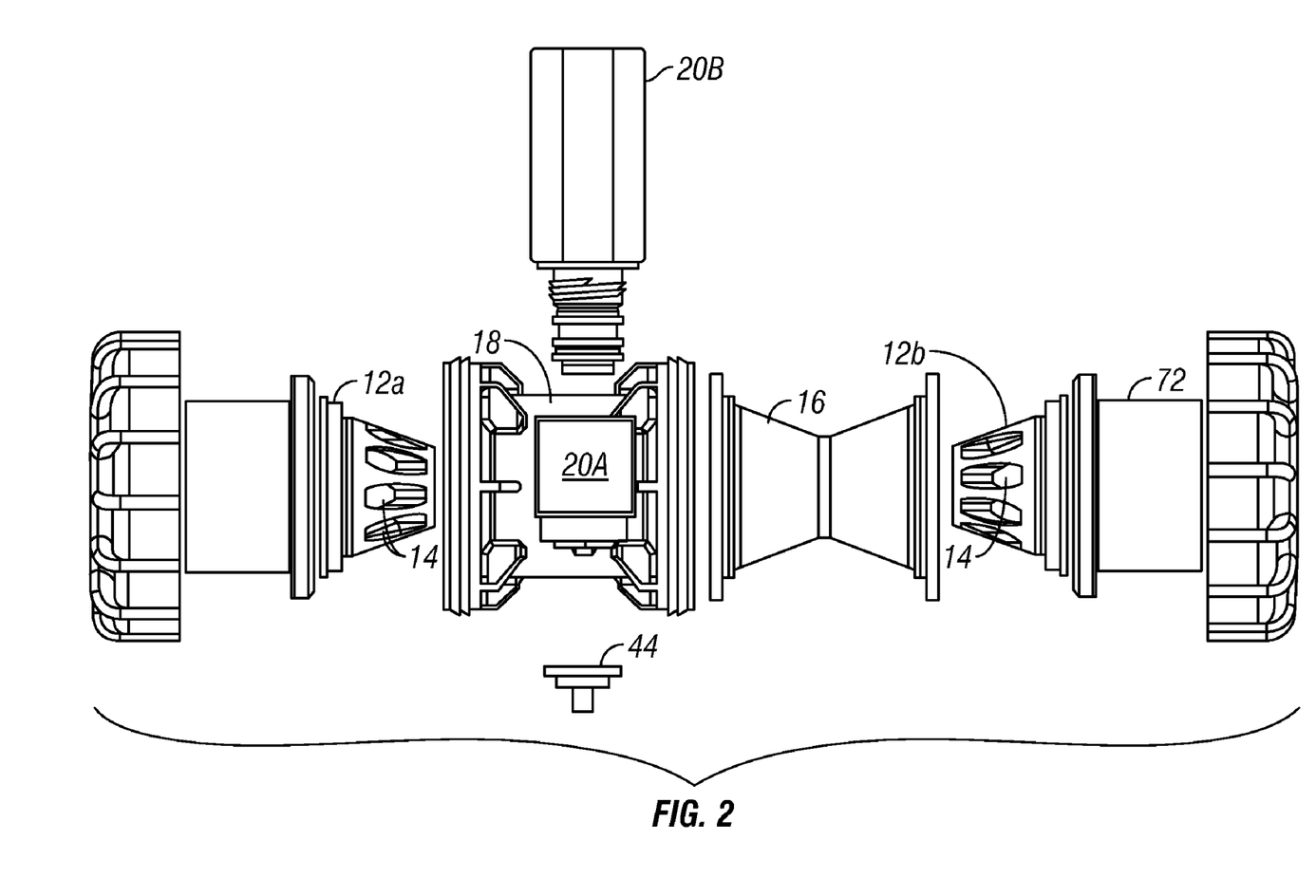
FIG. 2 is an exploded side elevation view of the sleeve valve of FIG. 1.
Figure 3:
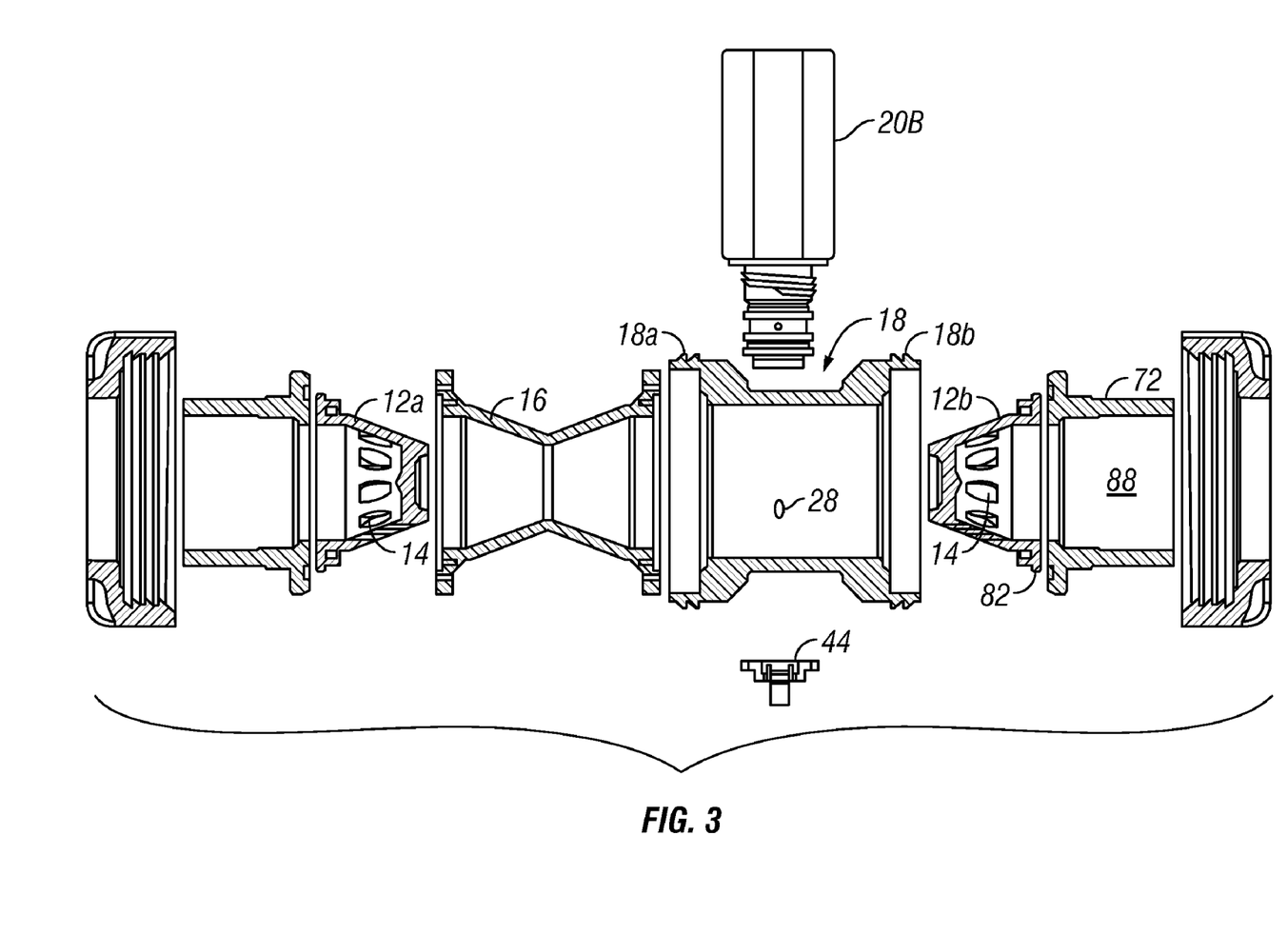
FIG. 3 is a view similar to FIG. 2 in longitudinal section.

Referring to FIG. 1, a sleeve valve 10 includes a rigid mandrel 12 (FIG. 4) with a plurality of circumferentially spaced openings 14. The mandrel 12 is made of opposing frusto-conical segments 12a and 12b (FIG. 3). A generally cylindrical, unitary hour-glass shaped elastomeric sleeve 16 (FIGS. 2-4) surrounds the mandrel 12. A generally cylindrical rigid sleeve valve housing 18 (FIGS. 1-4) surrounds the elastomeric sleeve 16 and defines a control chamber 19 (FIG. 4) between the elastomeric sleeve 16 and the sleeve valve housing 18 (FIG. 1). By way of example, the elastomeric sleeve 16 may be molded from material such as EPDM, PVC or silicone and the rigid sleeve valve housing 18 may be molded from material such as ABS plastic.

Figure 5:
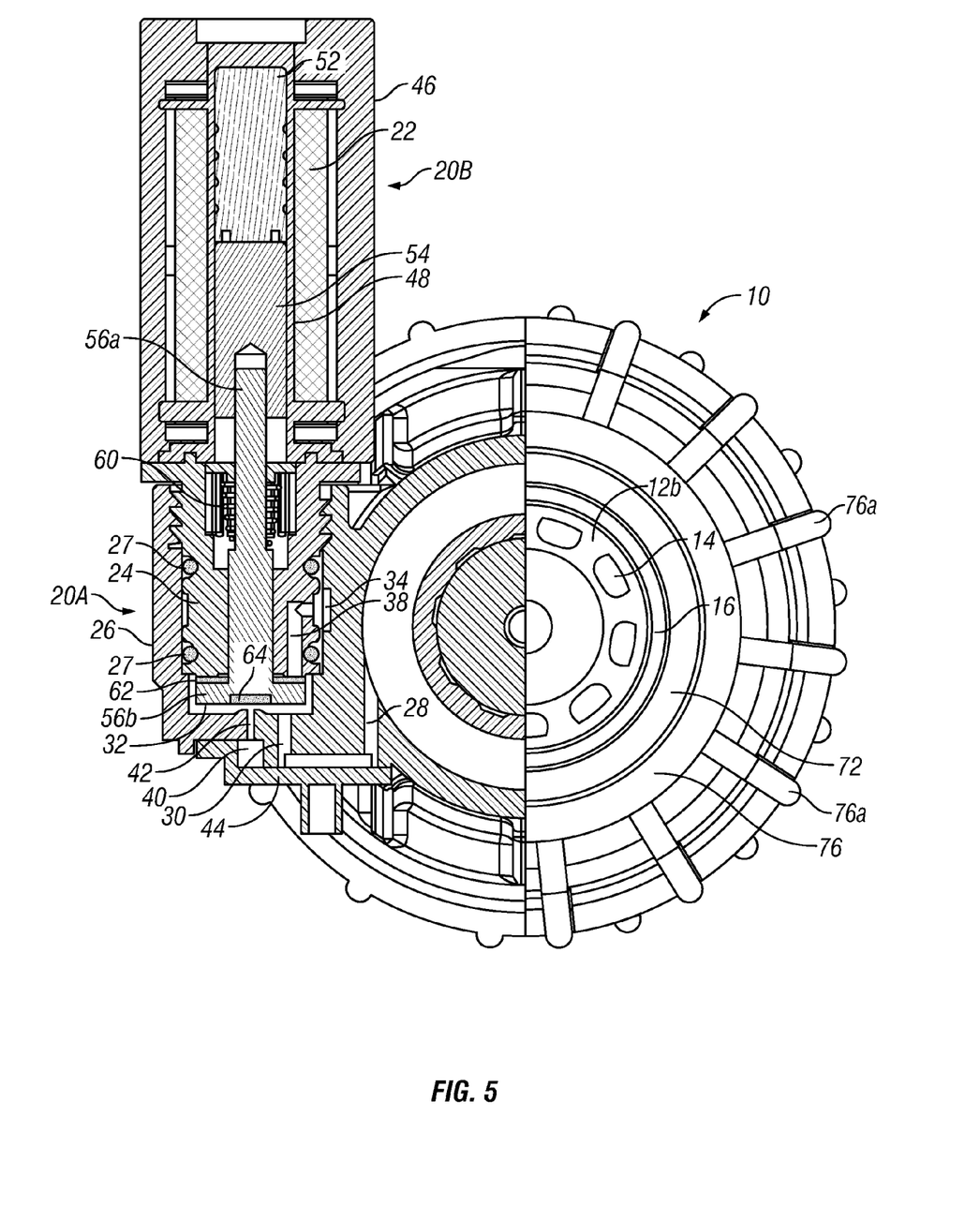
FIG. 5 is an enlarged end view of the sleeve valve of FIG. 1 illustrating its solenoid and pilot valve in longitudinal section when the sleeve valve in its OPEN state.
Figure 6:
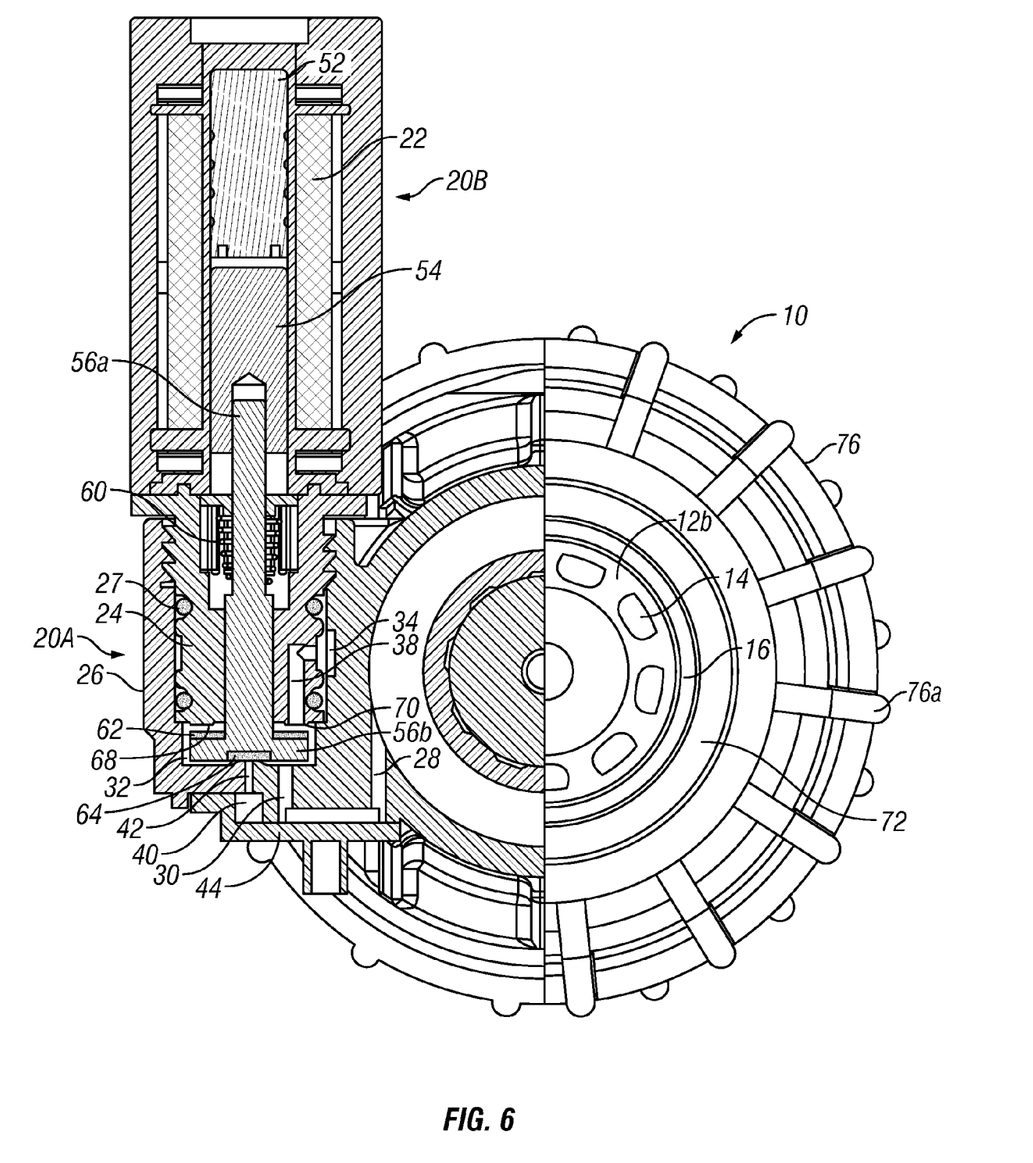
FIG. 6 is a view similar to FIG. 5 illustrating the solenoid and pilot valve when the sleev valve is in its CLOSED state.

A three-way pilot valve 20A (FIGS. 1 and 2) is externally mounted to the sleeve valve housing 18 for opening and closing the sleeve valve 10 by turning ON and OFF a low voltage AC control signal applied to a non-latching solenoid 20B. The low voltage AC signal is supplied via a pair of wires (not illustrated) connected between the solenoid 20B and an irrigation controller (not illustrated). A male threaded end cap 24 (FIG. 7) of the pilot valve 20A screws into a female threaded pilot valve housing 26 (FIGS. 5 and 6) the majority of which is integrally molded with the sleeve valve housing 18. O-rings 27 (FIG. 5) surround the end cap 24 and provide water-tight seals between end cap 24 and the pilot valve housing 26.

Figure 8:
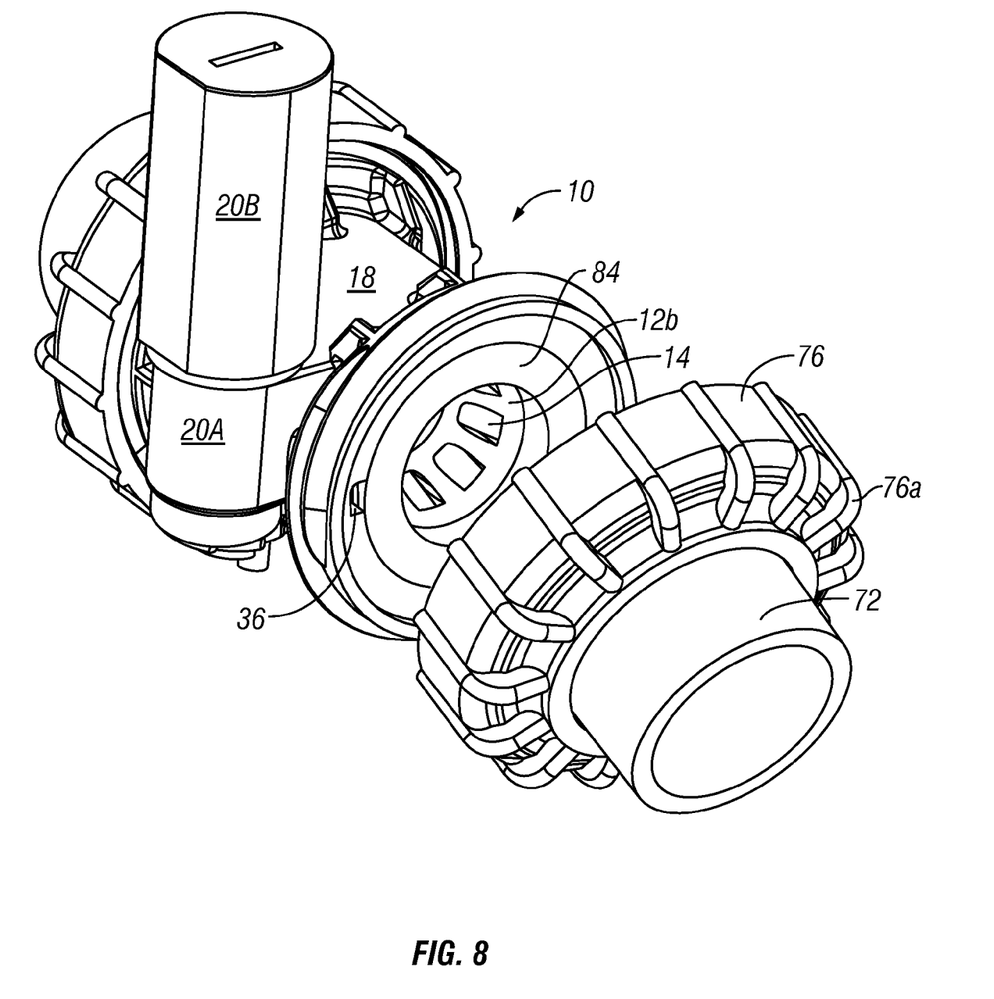
FIG. 8 is an isometric view of the sleeve valve of FIG. 1 with one of its collars unscrewed to reveal the inlet that leads to the pilot valve chamber.

The function of the pilot valve 20A is to supply pressurized liquid to, and vent p pressurized liquid from, the control chamber 19 of the sleeve valve 10. A passage 28 (FIGS. 3 and 5) formed in a wall of the sleeve valve housing 18 connects with a port 30 (FIG. 5) formed in the pilot valve housing 26. The port 30 connects with a pilot valve chamber 32 formed inside the pilot valve housing 26. A passage 34 (FIG. 1) formed in the sleeve valve housing 18 and the pilot valve housing 26 connects an inlet 36 (FIG. 8) at the inlet end 18a (FIG. 3) of the sleeve valve housing 18 to a port 38 (FIG. 5) in the end cap 24 which in turn connects to the pilot valve chamber 32. A relief passage 40 also formed in the sleeve valve housing 18 connects to a port 42 in pilot valve housing 26 which in turn connects to the pilot valve chamber 32. To simplify injection molding of the sleeve valve housing 18, a cover 44 (FIGS. 2, 3 and 5) is attached via suitable adhesive or sonic welding to the sleeve valve housing 18 to form passages 28 and 40. When the sleeve valve 10 is opened, pressurized water or other liquid from the control chamber 19 between the elastomeric sleeve 16 and housing 18 is released to the exterior of the sleeve valve 10 via relief passage 40 which terminates in a side opening (not illustrated).

Figure 7:
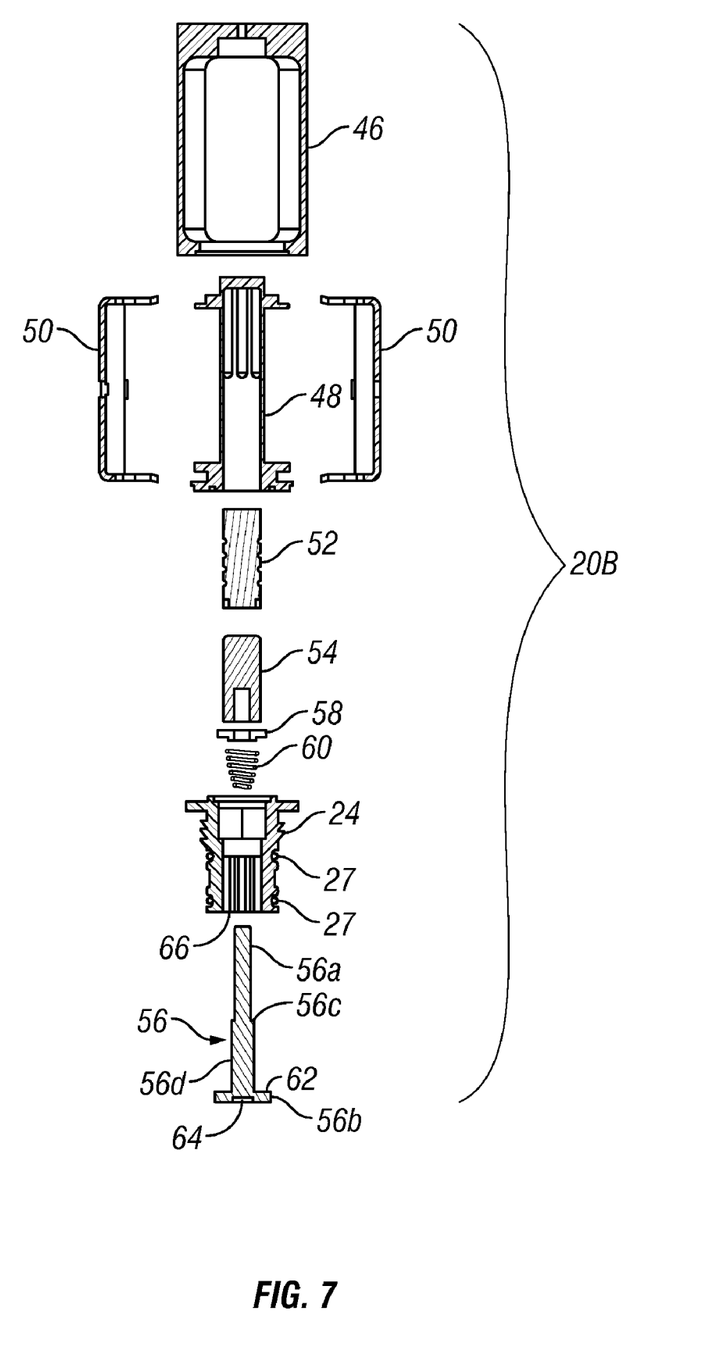
FIG. 7 is an enlarged exploded longitudinal section view of the solenoid portion of the pilot valve of the sleeve valve of FIG. 1.

The solenoid 20B (FIG. 1) of the pilot valve 20 has a construction similar to that disclosed in the aforementioned U.S. Pat. No. 5,979,482, the entire disclosure of which is hereby incorporated by reference. Referring to FIG. 7, the solenoid 20B includes a main outer cylindrical shell or housing 46, a central spool 48 and a pair of yokes 50 that surround the coil 22 (not visible in FIG. 7) and enhance the magnetic field generated by the coil 22. The region inside the housing 46 surrounding the coil is filled with a suitable potting compound (not illustrated). The solenoid 20B also includes a pole piece 52 that is secured in a fixed position within the spool 48 at one end of the spool 48. A cylindrical ferrous core plunger 54 acts as an armature and is dimensioned for precision reciprocation inside of the spool 48 beneath the pole piece 52. A piston 56 has a shaft 56a whose upper end is secured in a bore in one end of the plunger 54. The lower end of the piston shaft 56a is connected to a piston head 56b. The end cap 24 is secured to the lower end of the housing 46. A cylindrical sleeve 58 mounted inside the end cap 24 also abuts the lower end of the housing 46 and has a bore for receiving and guiding the piston shaft 56a. A coil spring 60 surrounds that sleeve 58 and is compressed between a shoulder 56c of the piston and a radial flange of the sleeve 58. The plunger 54 and piston 56 are normally in their lower extended positions illustrated in FIG. 6 in which the sleeve valve 10 is in its CLOSED state when the coil 22 is not energized. When the coil 22 is energized, the plunger 54 and piston 56 move upwardly to their raised retracted positions illustrated in FIG. 5 in which the sleeve valve 10 is in its OPEN state. When the plunger 54 and piston 56 are retracted, the coil spring 60 is compressed. The expansion of the coil spring 60 ensures that the plunger 54 and piston 56 move to their lower extended positions illustrated in FIG. 6 when the coil 22 is de-energized.

The diameter of the lower segment of the piston shaft 56a (FIG. 7) that is connected to the piston head 56b is greater than the diameter of the upper segment of the shaft 56a that connects the lower segment to the plunger 54. A first seal 62 (FIG. 5) in the form of an elastomeric ring surrounds the piston shaft 56a and is secured to the upper side or end of the piston head 56b. The seal 62 seals the lower end of the port 38 (FIG. 6) in the end cap 24 when the solenoid 20B is energized. A second seal 64 in the form of an elastomeric disk is secured in a circular recess formed in the lower side or end in the piston head 56b and seals the port 42 when the solenoid 20B is de-energized. Advantageously, no seal is required between the piston shaft 56a and the end cap 24. The longitudinal axis of a bore 66 through the end cap 24 and the longitudinal axis of the port 38 to are parallel. The longitudinal axis of the port 42 is co-axial with the longitudinal axis of the bore 66. The lower end of the port 38 opens on the end surface of the end cap 24. The lower end of the port 38 is spaced laterally from the bore 66. The upper end of the port 38 opens on a side surface of the end cap 24. The end surface of the end cap 24 has a first land 68 (FIG. 6) that is spaced laterally from (and radially outward of) the bore 66. The port 38 exits through a second land 70 formed on the end surface of the end cap 24. The seal 62 engages the land 70 to provide a water-tight seal that closes the lower end of the port 38 when the solenoid 20B is energized. The land 68 helps stabilize seal 62 and keep it perpendicular to the longitudinal axis of the solenoid 20B.

Figure 4:
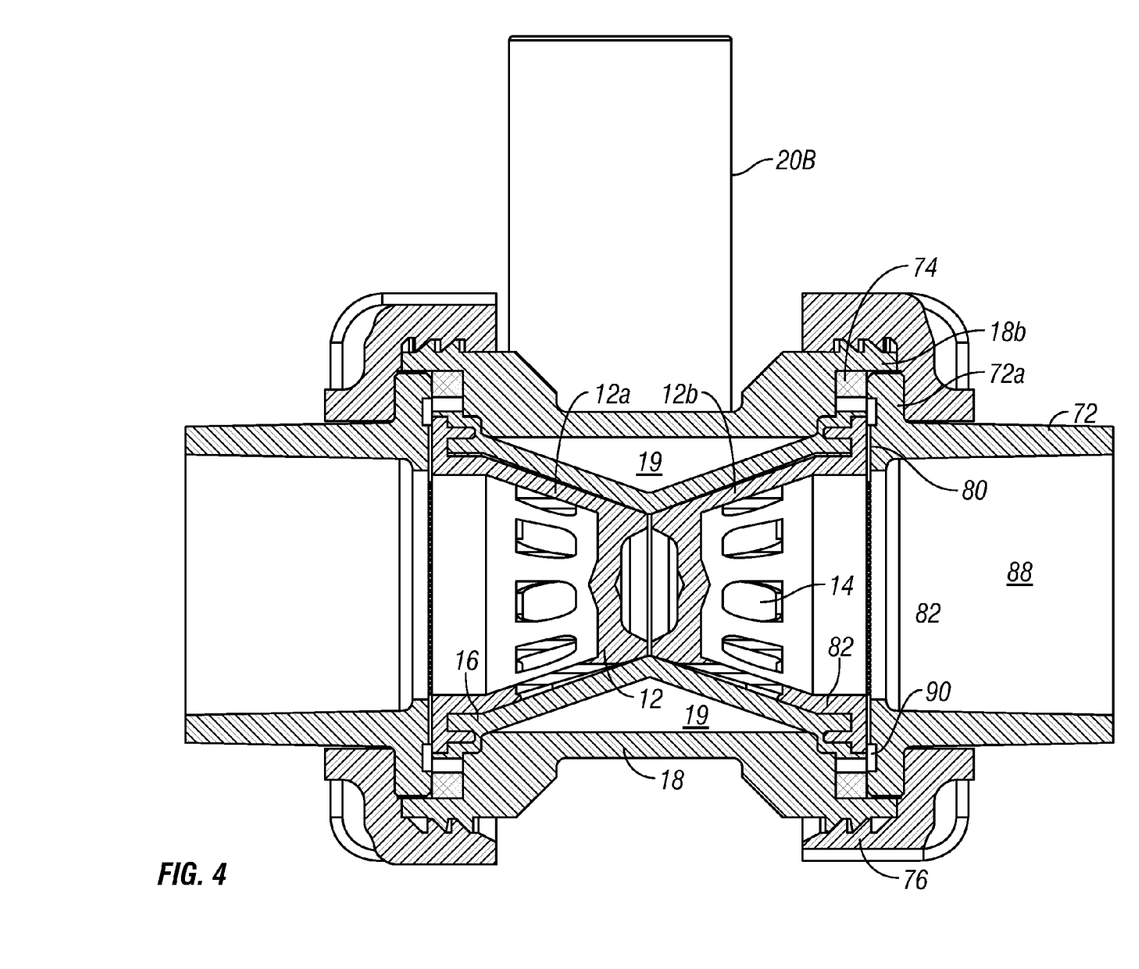
FIG. 4 is an enlarged assembled view of the sleeve valve of FIG. 1 in longitudinal section.

The pilot valve 10 includes means for coupling the inlet end 18a (FIG. 3) and the outlet end 18b of the sleeve valve housing 18 with pipe segments or other connectors (not illustrated) when the sleeve valve 10 is installed as part of an irrigation system. Typically the sleeve valve 10 will be one of several such valves housed in a subterranean valve box (not illustrated) that are wired to an irrigation controller (not illustrated) usually mounted in a garage or maintenance facility. Each coupling means is similar so only the coupling means for the outlet end 18b of the sleeve valve housing will be described. Referring to FIG. 4, a cylindrical member 72 has a radial flange 72a that seats against an elastomeric washer 74 captured inside the outlet end 18b of the sleeve valve housing 18. A female threaded collar 76 screws over the male threaded segment of the outlet end 18b and over the cylindrical member 72 to hold it tightly to the sleeve valve housing 18. The collar 76 is formed with external radially extending ribs 76a (FIGS. 5, 6 and 8) that facilitate manual gripping of the collar 76 to more easily allow it to be tightened securely to the sleeve valve housing 18.

Figure 9:
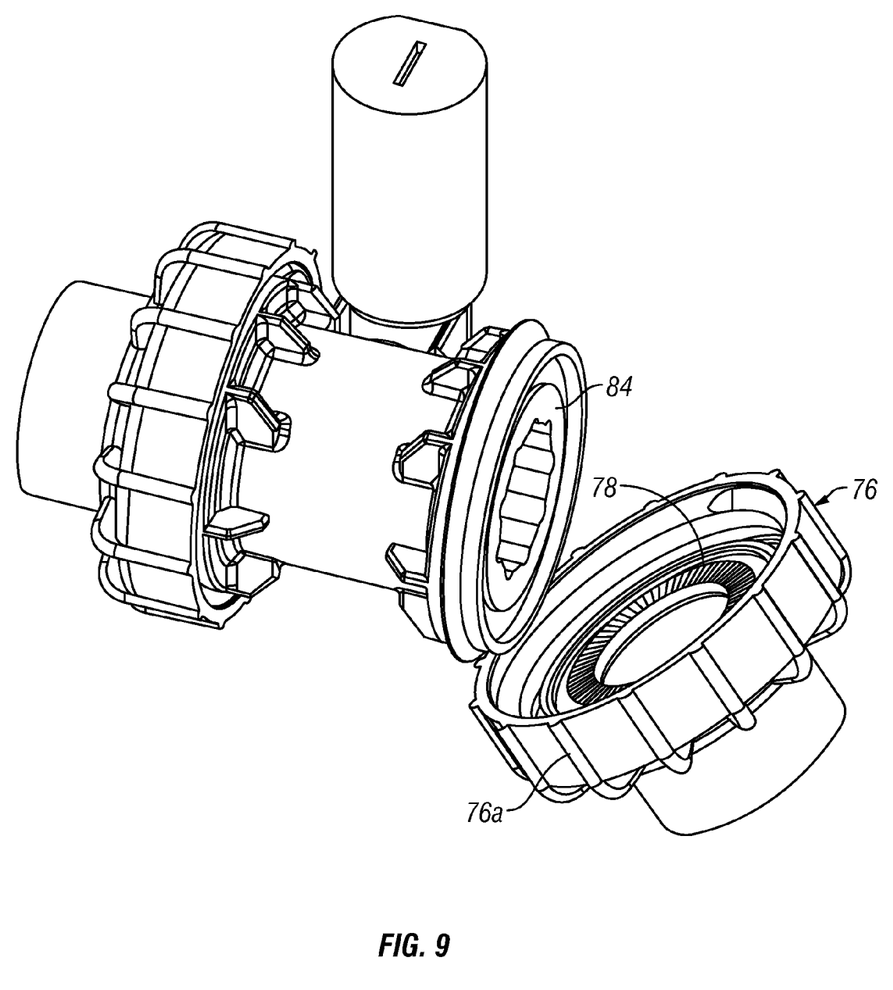
FIG. 9 is a view similar to FIG. 8 that shows the grooves in the cylindrical member that form the filter of the sleeve valve of FIG. 1.
Figure 10:
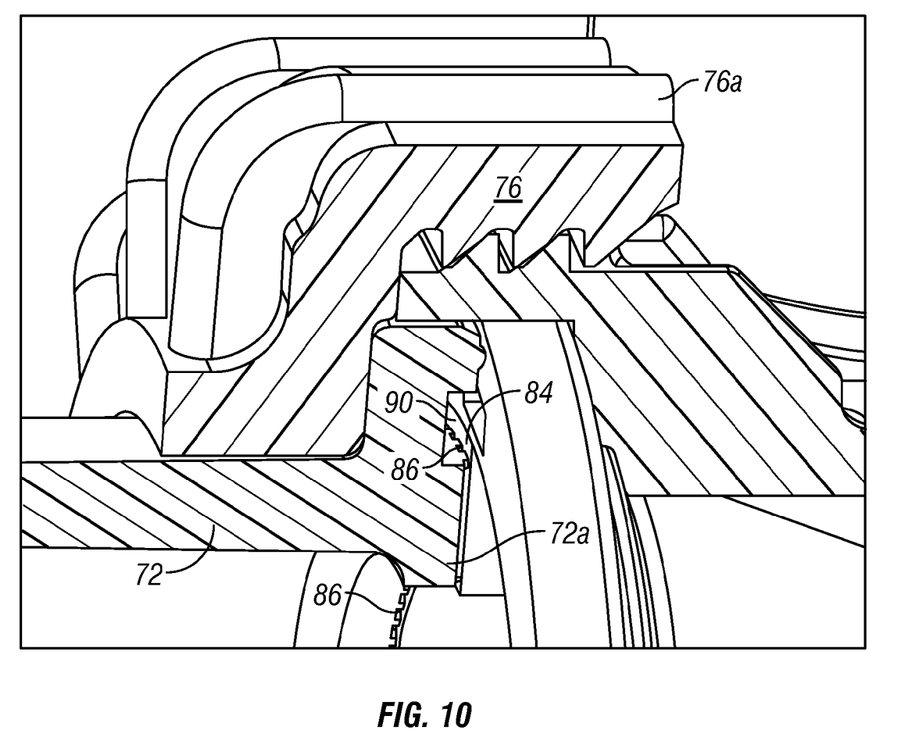
FIG. 10 is an enlarged fragmentary view illustrating the channels of the filter.

The pilot valve 20A is susceptible to damage and clogging if debris enters the same. One example of such debris is tiny suspended rocks and other particles that are typically carried in water supplied by a municipality or from a well to the inlet end 18a and then through the passage 34 (FIG. 1) that leads to the pilot valve 20A. Therefore the sleeve valve 10 includes a filter that screens debris from pressurized water or other liquid entering the inlet end 18a of the sleeve valve housing 18 before it enters the passage 34 that communicates with the pilot valve 20A. For sake of simplicity in manufacture, a similar filter also exists at the outlet end of the sleeve valve 10, but it does not perform any filtering function. However, due to the arrangement of the figures, the filter on the outlet side of the sleeve valve 10 will be described, it being understood that the same filter exits on the inlet side of the sleeve valve 10. The filter includes a plurality of radially extending ridges 78 (FIG. 9) formed on an inner side of a shoulder 80 (FIG. 4) of the radial flange 72a. An opposing shoulder 82 (FIG. 3) of the mandrel segment 12b includes an outwardly facing flat surface 84 (FIGS. 8 and 9) against which the ridges 78 of the radial flange 72a abut. A plurality of radially extending, relatively small channels 86 (FIG. 10) are formed between the ridges 78 and the flat surface 84 of shoulder 82. The channels 86 communicate between a central through bore 88 (FIGS. 3 and 4) of the cylindrical member 72 and an annular chamber 90 (FIG. 4) formed between the radial flange 72a and the inlet end 18a of the sleeve valve housing 18. The passage 34 (FIG. 1) terminates at the inlet 36 (FIG. 8) that opens into the annular chamber 90 on the inlet side of the sleeve valve 10. Thus incoming pressurized liquid can flow through the bore 88 of the cylindrical member 72, through the channels 86 (FIG. 10) formed between the radial flange 72a and the flat surface 84 of the mandrel segment 12b. Many particles of debris in the water will be too large to enter the channels 86 and will be washed through the relatively large openings 14 in the mandrel 12 and through the sleeve valve 10 when it is in its OPEN state. Other particles that are small enough to enter the channels 86 will become lodged therein. The cleansed pressurized liquid will flow from the outer ends of the channels 86 into the annular chamber 90. Thus the small passages and seals of the pilot valve 20A will be protected because suspended particulate matter is prevented from entering the passage 34 via the inlet 36. The filter can be cleaned by unscrewing the collar 76, removing the cylindrical member 72 and brushing its channels 86 clean of debris. The channels 86 have a rectangular cross-section as illustrated in FIG. 10, although they could have a V-shaped cross-section, rounded cross-section, or any other cross-section, depending upon the filtering requirements. While the channels 86 extend radially in a straight path, they could have a variety of paths, including a convoluted path.

As illustrated in FIGS. 1 and 7, the surfaces of the cylindrical member 72 are smooth on both the inside and outside surfaces for joining to a suitably dimensioned pipe segment with solvent-type welding adhesive. The internal and external diameters of the cylindrical member 72 are preferably selected so that they will accommodate standard diameters of plastic pipe used in irrigation. In some cases a slight taper of the internal and external surfaces may be appropriate.

Figure 11A:
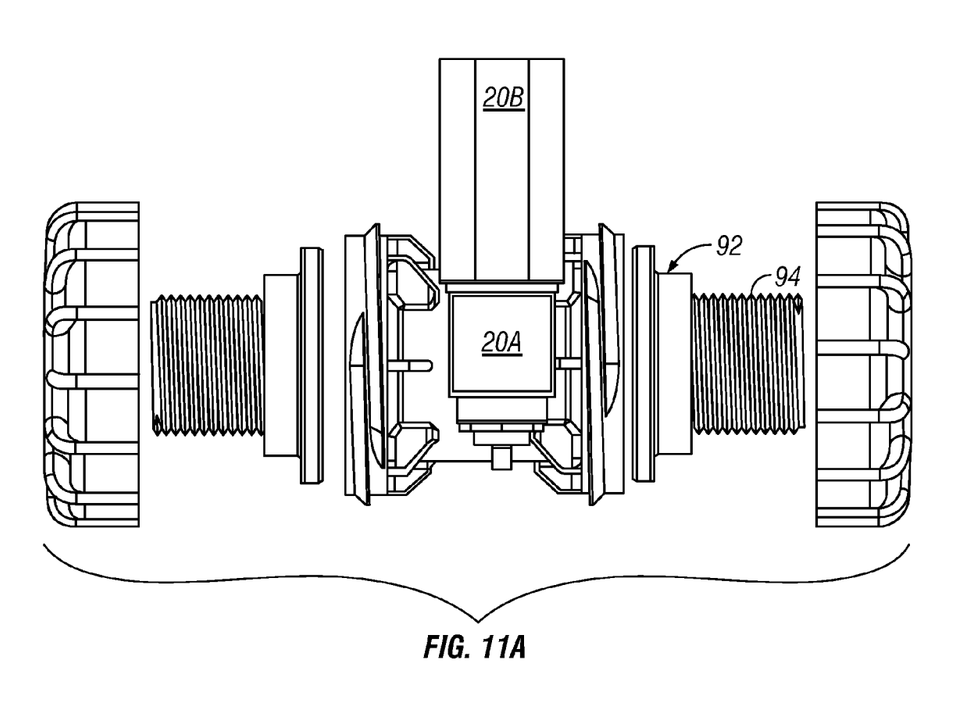
FIGS. 11A and 11B are exploded and assembled side elevation views illustrating male threaded cylindrical members for coupling the sleeve valve of FIG. 1 to female threaded connectors or pipe segments.
Figure 11B:
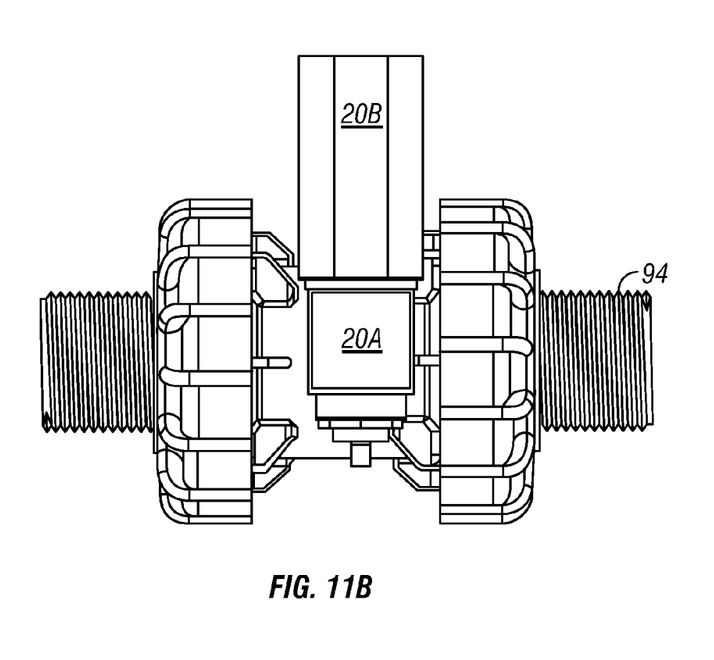

FIGS. 11A and 11B illustrate an alternate embodiment that utilizes a cylindrical member 92 with a male threaded segment 94 for facilitating threaded connection of the sleeve valve 10 to a female threaded connector or pipe segment (not illustrated).

Figure 12A:
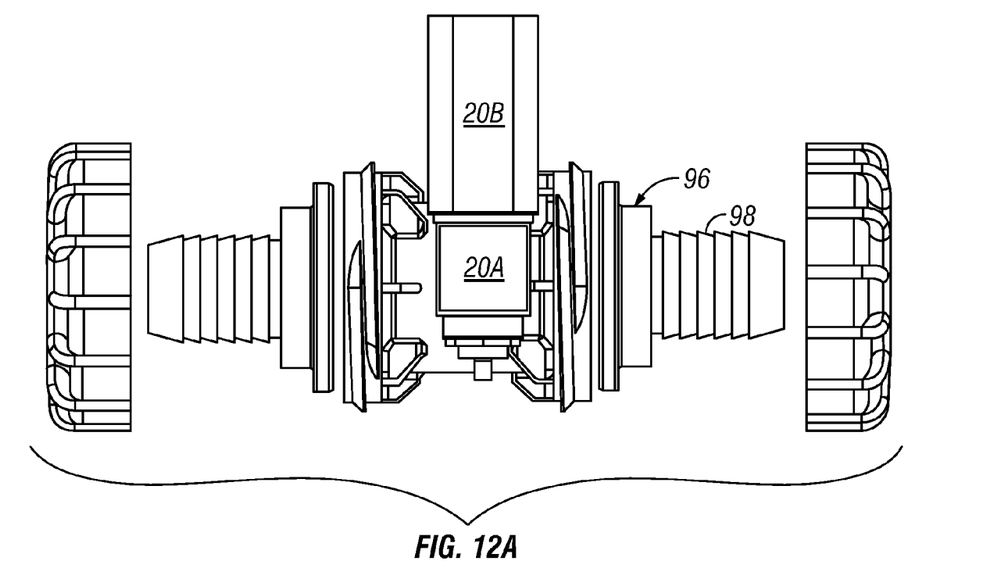
FIGS. 12A and 12B are exploded and assembled side elevation views illustrating barbed cylindrical members for coupling the sleeve valve of FIG. 1 to complementary barbed connectors.
Figure 12B:
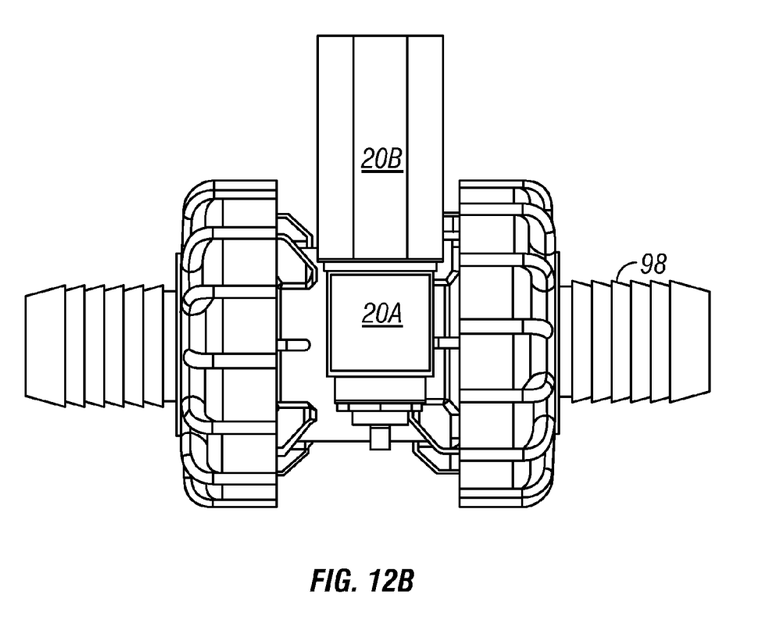

FIGS. 12A and 12B illustrate an alternate embodiment that utilizes a cylindrical member 96 with a barbed segment 98 for facilitating watertight connection of the sleeve valve 10 to a complementary barbed connector (not illustrated).

The overall operation of the sleeve valve 10 will now be described. When the solenoid 20B is not energized, the spring 60 forces the piston 56 downwardly to its extended position illustrated in FIG. 6. In this position, the seal 64 closes the port 42 and the seal 62 is disengaged from the land 70, opening the port 38. Pressurized water from the inlet 36 travels through the passage 34, through the port 38 and into the pilot valve chamber 32. This water then travels from the pilot valve chamber 32, through the port 30 and the passage 28 into the control chamber 19 (FIG. 4) of the sleeve valve 10 between the sleeve valve housing 18 and the elastomeric sleeve 16. Pressure builds up inside the sleeve valve control chamber 19, forcing the elastomeric sleeve 16 inwardly and sealing (closing off) the openings 14 in the mandrel 12. The flow through the main flow passage of the sleeve valve 10 is now stopped and the sleeve valve 10 is in its CLOSED state. When the solenoid 20B is energized, the piston 56 is forced upwardly to its retracted position illustrated in FIG. 5. The seal 62 closes off port 38, shutting off the source of pressurized water from the inlet 36 through the passage 34. The seal 64 is disengaged from the port 42. Water from the control chamber 19 inside the sleeve valve 10 to be expelled through passages 28 and 30 and into the pilot valve chamber 32. This water then exits the pilot valve 20A via port 42 and relief passage 40. The elastomeric sleeve 16 expands and water flows through the main flow passage of the sleeve valve 10 which is now in its OPEN state.

While I have described an embodiment of a sleeve valve that incorporates my invention, variations and modifications thereof will occur to others skilled in the art. For example, the sleeve valve housing 18 need not have the passage 34 formed therein for delivering pressurized liquid from the cylindrical member to the pilot valve 20A. A hose (not illustrated) could be connected between the annular chamber 64 and the pilot valve 20A. The solenoid 20B need not have a separate end cap 24. My sleeve valve could be made without the filter and would still have an advantageous configuration as a result of its highly versatile coupling means. Conversely, my sleeve valve could be made with the filter only, and without the coupling means, and would still have the benefit of greater reliability due to its grit protection. The filter could be varied by using other screening mechanisms besides the radially extending channels 86. Therefore, the protection afforded my invention should only be limited in accordance with the following claims.

I claim:

1. A sleeve valve, comprising:
   a rigid mandrel including opposing frusto-conical segments with a plurality of openings;
   a generally cylindrical elastomeric sleeve surrounding the mandrel and deformable to seal the openings;
   a generally cylindrical rigid sleeve valve housing surrounding the elastomeric sleeve and defining a control chamber between the sleeve valve housing and the elastomeric sleeve, the sleeve valve housing having a first passage formed in a wall of the sleeve valve housing and communicating with the control chamber, an inlet end, and an outlet end;
   a pilot valve for supplying pressurized liquid to, and venting pressurized liquid from, the control chamber through the first passage;
   a filter that screens debris from pressurized liquid entering the inlet end of the sleeve valve housing before it enters a second passage that communicates with the pilot valve;
   first and second means for coupling the inlet end and the outlet end with first and second connectors or pipe segments, respectively, each coupling means including a cylindrical member with a radial flange and a female threaded collar that screws over a male threaded segment of the inlet end or outlet end;
   wherein the filter includes a plurality of radially extending ridges formed on an end of the radial flange of the cylindrical member of the coupling means for the inlet end of the sleeve valve housing; and
   wherein the mandrel includes a flat surface against which the ridges of the radial flange abut to define a plurality of radially extending channels that communicate between a bore of the cylindrical member and an annular chamber formed between the radial flange and the sleeve valve housing.

2. The sleeve valve of claim 1 wherein the second passage is formed in the sleeve valve housing.

3. The sleeve valve of claim 1 wherein the second passage communicates with the annular chamber.

4. A sleeve valve, comprising:
   a rigid mandrel including opposing frusto-conical segments with a plurality of openings;

a generally cylindrical elastomeric sleeve surrounding the mandrel and deformable to seal the openings;

a generally cylindrical rigid sleeve valve housing surrounding the elastomeric sleeve and defining a control chamber between the sleeve valve housing and the elastomeric sleeve, the sleeve valve housing having a first passage formed in a wall of the sleeve valve housing and communicating with the control chamber, an inlet end, and an outlet end;

a pilot valve for supplying pressurized liquid to, and venting pressurized liquid from, the control chamber through the first passage;

first and second means for coupling the inlet end and the outlet end with first and second connectors or pipe segments, respectively, each coupling means including a cylindrical member with a radial flange and a female threaded collar that screws over a male threaded segment of the inlet end or outlet end;

a filter that screens debris from pressurized liquid entering the inlet end of the sleeve valve housing before it enter a second passage that communicates with the pilot valve;

wherein the filter includes a plurality of radially extending ridges formed on an end of the radial flange of the cylindrical member of the coupling means for the inlet end of the sleeve valve housing; and wherein the mandrel includes a flat surface against which the ridges of the radial flange abut to define a plurality of radially extending channels that communicate between a bore of the cylindrical member and an annular chamber formed between the radial flange and the sleeve valve housing.

5. The sleeve valve of claim 4 wherein the surfaces of the cylindrical member are smooth.

6. The sleeve valve of claim 4 wherein the external surfaces of the cylindrical member have threads.

7. The sleeve valve of claim 4 wherein the external surfaces of the cylindrical member have barbs.

8. The sleeve valve of claim 4 wherein the second passage is formed in the sleeve valve housing.

9. The sleeve valve of claim 4 wherein the second passage communicates with the annular chamber.

10. The sleeve valve of claim 4 wherein the pilot valve is a three-way valve.

11. The sleeve valve of claim 4 wherein the pilot valve is mounted to an exterior of the sleeve valve housing.

12. The sleeve valve of claim 4 wherein each collar is formed with external radially extending ribs.

13. A sleeve valve, comprising:

a rigid mandrel including opposing frusto-conical segments with a plurality of openings;

a generally cylindrical elastomeric sleeve surrounding the mandrel and deformable to seal the openings;

a generally cylindrical rigid sleeve valve housing surrounding the elastomeric sleeve and defining a control chamber between the sleeve valve housing and the elastomeric sleeve, the sleeve valve housing having a first passage formed in a wall of the sleeve valve housing and communicating with the control chamber, an inlet end, and an outlet end;

a three-way pilot valve mounted to the sleeve valve housing for supplying pressurized liquid to, and venting pressurized liquid from, the control chamber through the first passage;

a filter that screens debris from pressurized liquid entering the inlet end of the sleeve valve housing before it enters a second passage that communicates with the pilot valve, the filter including a cylindrical member for attachment to external plumbing and a plurality of channels that communicate between a bore of the cylindrical member and an annular chamber formed between a radial flange of the cylindrical member and the sleeve valve housing; and first and second means for coupling the inlet end and the outlet end with first and second connectors or pipe segments, respectively, each coupling means including a cylindrical member with a radial flange and a female threaded collar that screws over a male threaded segment of the inlet end or outlet end.

14. A sleeve valve, comprising:

a rigid mandrel including opposing frusto-conical segments with a plurality of openings;

a generally cylindrical elastomeric sleeve surrounding the mandrel and deformable to seal the openings;

a generally cylindrical rigid sleeve valve housing surrounding the elastomeric sleeve and defining a control chamber between the sleeve valve housing and the elastomeric sleeve, the sleeve valve housing having a first passage formed in a wall of the sleeve valve housing and communicating with the control chamber, an inlet end, and an outlet end;

a pilot valve for supplying pressurized liquid to, and venting pressurized liquid from, the control chamber through the first passage; and a filter that screens debris from pressurized liquid entering the inlet end of the sleeve valve housing before it enters a second passage that communicates with the pilot valve, the filter including a cylindrical member for attachment to external plumbing and a plurality of channels that communicate between a bore of the cylindrical member and an annular chamber formed between a radial flange of the cylindrical member and the sleeve valve housing.

15. The sleeve valve of claim 14 wherein the channels extend radially.

16. The sleeve valve of claim 14 wherein the filter includes a plurality of radially extending ridges formed on an end of a radial flange of the cylindrical member.

17. The sleeve valve of claim 15 wherein the mandrel includes a flat surface against which the ridges of the radial flange abut to define a plurality of radially extending channels.

18. The sleeve valve of claim 14 wherein the channels have a radial cross-section.

* * * * *